（12） United States Patent
Wood, III et al.

(10) Patent No.: US 10,479,882 B2
(45) Date of Patent: Nov. 19, 2019

(54) ROTATIONAL MOLDABLE COMPOSITION COMPRISING POLYETHYLENE, AND A BLEND OF A PIGMENT AND A POLYETHYLENE COPOLYMER

(71) Applicant: TEKNOR APEX COMPANY, Pawtucket, RI (US)

(72) Inventors: John J. Wood, III, Smithfield, RI (US); Charlie J. Allbritton, Bullard, TX (US); Troy F. Duckworth, Henderson, KY (US); Katherine A. Herrick, Jacksonville, TX (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 63 days.

(21) Appl. No.: 15/954,997

(22) Filed: Apr. 17, 2018

(65) Prior Publication Data

US 2019/0077939 A1    Mar. 14, 2019

Related U.S. Application Data

(60) Provisional application No. 62/558,533, filed on Sep. 14, 2017.

(51) Int. Cl.
 *C08L 23/06* (2006.01)
 *B29C 41/04* (2006.01)
 *B29C 41/00* (2006.01)
 *B29K 105/00* (2006.01)

(52) U.S. Cl.
 CPC ............ *C08L 23/06* (2013.01); *B29C 41/003* (2013.01); *B29C 41/04* (2013.01); *B29K 2023/06* (2013.01); *B29K 2105/0032* (2013.01); *B29K 2105/0085* (2013.01); *B29K 2105/0088* (2013.01)

(58) Field of Classification Search
 CPC ....... C08L 23/06; B29C 41/003; B29C 41/04; B29K 2023/06; B29K 2105/0032; B29K 2105/0085; B29K 2105/0088
 USPC .......................................................... 524/528
 See application file for complete search history.

(56) References Cited

U.S. PATENT DOCUMENTS

| | | | |
|---|---|---|---|
| 4,025,480 A | * | 5/1977 | Larsen .................... C08J 3/203 523/324 |
| 4,906,428 A | | 3/1990 | Kelly |
| 6,433,086 B1 | | 8/2002 | Swain |
| 7,087,668 B2 | | 8/2006 | Hohner et al. |
| 7,087,753 B2 | † | 8/2006 | Toan |
| 7,442,742 B1 | | 10/2008 | Smink et al. |
| 9,505,868 B2 | | 11/2016 | Doneva et al. |
| 2004/0147680 A1 | | 7/2004 | Sugimoto |
| 2005/0113486 A1 | | 5/2005 | Sandieson et al. |
| 2009/0306274 A1 | | 12/2009 | Maziers |
| 2010/0004378 A1 | † | 1/2010 | Ommundsen |

FOREIGN PATENT DOCUMENTS

| | | |
|---|---|---|
| CA | 1230271 A | 12/1987 |
| CN | 102070820 A | 5/2011 |
| WO | 2008077516 A1 | 7/2008 |

OTHER PUBLICATIONS

Association of Rotational Molders International, Low Temperature Impact Test; Version 4.0, Jul. 2003, pp. 1-17.
Crawford, Roy J., and James L. Throne (Editors). Rotational Molding Technology, Chapter 3 "Grinding and Coloring," pp. 69-110, published by William Andrew Publishing, 2002.†

\* cited by examiner
† cited by third party

*Primary Examiner* — William K Cheung
(74) *Attorney, Agent, or Firm* — Hudak, Shunk & Farine Co. LPA

(57) ABSTRACT

A preblend of one or more pigments and one or more polymers derived from ethylene monomers and α-olefin monomers when added to polyethylene unexpectedly results in high improvements in impact strength with regard to rotationally molded products as compared to the same products not blended with any preblend. The result is a cost effective, high impact resistant polyethylene that is a physical, dry color blend.

21 Claims, No Drawings

ROTATIONAL MOLDABLE COMPOSITION COMPRISING POLYETHYLENE, AND A BLEND OF A PIGMENT AND A POLYETHYLENE COPOLYMER

FIELD OF THE INVENTION

The present invention relates to a preblend of one or more pigments and one or more polymers derived from ethylene monomers and α-olefin monomers that, when added to polyethylene unexpectedly result in high improvements in impact strength of rotationally molded products as compared to the same products not blended with any preblend but with only a pigment. The result is a cost effective, high impact resistant polyethylene that is a physical, dry color blend.

BACKGROUND OF THE INVENTION

Rotomolders face a dilemma when it comes to color. The most cost effective method of coloring their parts is to buy blends of raw pigments referred to as dry color. Dry color is known for being cost effective but is known to cause physical property loss at higher loadings. Use of dry color frequently yields unacceptable impact resistance, a key performance metric in the Roto Molding Industry. Another drawback of the dry color method is that the products are often brittle, and often contain a speckled appearance on the surface of the product or part. The alternative is more-costly pulverized precolored compounds, which allows for higher pigment loadings and better physical properties. The industry would clearly benefit from a third option providing acceptable impact performance without the cost penalty of using precolored compounds.

Larger dry color particulates can negatively affect finished part performance by encouraging stress cracking. The additional shear applied in the extrusion of precolored compounds reduces the size of these particulates. Significant cost is added in this process however, both in the compounding and pulverizing steps. Improved part performance comes at a significant cost penalty. Color suppliers have yet to provide a cost-effective alternative.

SUMMARY OF THE INVENTION

The present invention relates to a physical, dry color preblend derived from mixing a pigment with a polyethylene copolymer. The polyethylene copolymer is derived from monomers of ethylene and $C_4$-$C_{10}$ α-olefins with 1-octene being preferred. Subsequently, the preblend can be mixed with various densities of polyethylene, as by a final user, and rotationally molded to form a final product. While only small amounts of the pigment-polyethylene copolymer blend are added to polyethylene, surprisingly improved impact strengths are obtained that allow thinner walled, rotationally molded products to be made. This invention also results in better pigment dispersion and improved surface appearance in the final part when compared to traditional dry color products A physical, dry color composition, comprising: a mixture of a preblend of a pigment-polyethylene copolymer, and polyethylene; said pigment-copolymer preblend derived from about 0.06 to about 0.90 parts by weight of one or more pigments and about 1 part by weight of one or more polyethylene-α-olefin copolymers, said amounts based upon about 100 parts by weight of said polyethylene.

A process for making a physical, dry color polymer blend, comprising the steps of making a preblend comprising a mixture of one or pigments and one or more polyethylene copolymers; and subsequently mixing said preblend with about 100 parts by weight of a polyethylene.

DETAILED DESCRIPTION OF THE INVENTION

The preblend component of the present invention, that is the pigment-polyethylene copolymer blend, can contain one or more pigments therein, either inorganic or organic. The inorganic pigments include one or more of metal oxides, titanium dioxide, carbon black, iron oxide, ultramarine blue, cadmium sulfide, chromium oxide, iron, or any combination thereof. Such inorganic pigments as well as other pigments are well known to the art and to the literature and are available from many different sources. Organic pigments include one or more of various phthalocyanines, various quinarcidones, and the like, as well as any combination thereof. These and other organic pigments are well known to the art and to the literature and are also available from any different sources. The particle size of the one or more different pigments is generally less than about 100 microns and generally greater than about 5 microns and preferably about 20 microns.

The amount of the one or more pigments is generally small, such as from about 0.06 parts by weight to about 0.90 parts by weight, desirably from about 0.2 to about 0.8 parts by weight, and preferably from about 0.4 to about 0.75 parts by weight based upon 1 part by weight of the polyethylene copolymer. Since the preblend comprising the one or more pigments is based upon one part by weight of the polyethylene copolymer, the amount of the preblend, i.e. pigment plus polyethylene copolymer, is from about 1.06 to about 1.9 parts by weight per 100 parts by weight of the polyethylene per se, e.g. high density polyethylene, low density polyethylene, or linear low density polyethylene.

The polyethylene copolymer, as noted, is derived from one or more ethylene monomers and one or more α-olefin monomers containing from 4 to 10 carbon atoms. The preferred α-olefin compound is 1-octene and such polyethylene copolymers are made by Dow and are sold under the trademark "ENGAGE™". The size of the polyethylene copolymer such as ENGAGE™ 8150 is generally from about 100 to about 1,000 microns, desirably from about 200 to about 700 microns, and preferably from about 200 to about 500 microns. The above-noted one or more pigments, and polyethylene copolymers can be blended utilizing a shear-blending machine such as a Henschell. Subsequently, the preblend can be packaged and sold for later mixing with a polyethylene resin to produce the physical, dry color compositions of the present invention. Alternatively, the preblend can be subsequently blended, by the preblend producer, with additional polyethylene, to form a rotation moldable blend to form a desired rotational moldable article therefrom.

The pigment-polyethylene copolymer blends, or the polyprebend-polyethylene blend, can contain various additives therein well known to the art and to the literature such as various antioxidants, various polyethylene waxes, and various dispersion aids such as metallic stearates, fatty esters, and the like. Suitable amounts thereof are also well known to the art and the literature.

The major component of the dry colored composition blend of the present invention is polyethylene. Generally, any density polyethylene of from about 0.91 to about 0.97 grams per cubic centimeter can be utilized. Such polyethylenes include LLDPE (linear low density polyethylene), or LDPE (low density polyethylene), that generally have a density of from about 0.91 to about 0.94 grams per cubic centimeter. Also, HDPE (high density polyethylene) can also be utilized that generally has a density of greater than 0.94 to about 0.97 grams per cubic centimeter. The amount of the one or more different types of polyethylene utilized is generally about 100 parts by weight upon which the above-noted amounts of pigment-polyethylene copolymer preblend are based. The particle size of the polyethylene can vary over a large range as from about 74 to about 2,000 microns with from about 150 to about 500 microns being preferred.

Mixing of the pigment-polyethylene copolymer blend and the polyethylene can be carried out generally utilizing one or more processes known to the literature and to the art.

The invention will be better understood by reference to the following examples that serve to illustrate, but not limit the scope of the present invention.

TABLE 1 testing done in rotomolding applications

| Example | Sample | Letdown Polymer | Colorant Dry Blend | Percent Impact Improvement utilizing only a polyethylene copolymer such as EGAGE 8150, E.G. 1-octene (a Control) vs. a preblend of one part by weight by weight of a polyethylene copolymer with 0.3 or 0.4, or 0.5, or 0.1 part by weight per 100 parts by weight of HDPE or LLDPE |
|---|---|---|---|---|
| 1 | Natural HDPE | HDPE | 1 pph Control | 8% improvement |
| 2 | Natural LLDPE | LLDPE | 1 pph Control | 18% improvement |
| 3 | Red 1 | LLDPE | 1.3 pph | 40% improvement |
| 4 | Green | HDPE | 1.4 pph | 27% improvement |
| 5 | Red 2 | HDPE | 1.5 pph | 50% Improvement |
| 6 | Black | HDPE | 1.1 pph | 33% improvement |

The above impact data was obtained utilizing the Association of Rotomolding (ARM) Cold Impact Test. This test was performed on a Rototron Corporation tester, model 400. Rotomolded ⅛" parts were impacted at −40° per the conditions specified in the ARM Cold Impact test method. The exact test method is set forth in the Appended "Association of Rotational Molders International—Low Temperature Impact Test of July 2013, Version 4.0.

Example 1-100 parts by weight of Natural HDPE; 1 part by weight of ENGAGE™ 8150, and no parts by weight of pigment (Control).

Example 2-100 parts by weight of Natural LLDPE; 1 part by weight of ENGAGE™ 8150, and no parts by weight of pigment (Control).

Example 3-100 parts by weight of LLDPE, 1 part by weight of ENGAGE™ 8150, and 0.3 parts by weight of Red 1 pigment.

Example 4-100 parts by weight of HDPE, 1 part by weight of ENGAGE™ 8150, and 0.4 parts by weight of Green pigment.

Example 5-100 parts by weight of HDPE, 1 part by weight of ENGAGE™ 8150, and 0.5 parts by weight of Red 2 pigment.

Example 6-100 parts by weight of HDPE, 1 part by weight of ENGAGE™ 8150, and 0.10 parts by weight of Black pigment.

The above blend has also been found to have better pigment dispersion, higher pigment loading while still exceeding previous impact strength limits, as well as stronger, more saturated colors in the broader color gamut. Stated differently, benefits similar to pulverized, pre-colored compounds are obtained while the low costs of dry color preparation are retained.

While in accordance with the Patent Statutes, the best mode and preferred embodiments have been set forth, the scope of the invention is not limited thereto, but rather, by the scope of the attached claims.

What is claimed is:

1. A physical, dry color composition, comprising:
    a mixture of a preblend of a pigment-polyethylene copolymer, and polyethylene;
    said pigment-copolymer preblend derived from about 0.06 to about 0.90 parts by weight of one or more pigments and about 1 part by weight of one or more polyethylene-α-olefin copolymers, said amounts based upon about 100 parts by weight of said polyethylene.

2. The physical, dry color composition of claim 1, wherein said polyethylene copolymer is derived from ethylene monomers and $C_4$-$C_{10}$ α-olefin monomers, and wherein the amount of said pigment in said pigment-polyethylene copolymer blend is from about 0.20 to about 0.80 parts by weight.

3. The physical, dry color composition of claim 2, wherein said polyethylene copolymer is derived from ethylene monomers and 1-octene monomers, and wherein the amount of said pigment in said pigment-polyethylene copolymer blend is from about 0.40 to about 0.75 parts by weight.

4. The physical, dry color composition of claim 1, wherein the particle size of said polyethylene copolymer is from about 100 to about 1,000 microns, and wherein the particle size of said polyethylene is from about 74 to about 2,000 microns.

5. The physical, dry color composition of claim 3, wherein the particle size of said polyethylene copolymer is from about 200 to about 500 microns, and wherein the particle size of said polyethylene is from about 74 to about 2,000 microns.

6. The physical, dry color composition of claim 1, wherein said polyethylene is LLDPE, LDPE, or HDPE.

7. The physical, dry color composition of claim 2, wherein said polyethylene is LLDPE, LDPE, or HDPE.

8. The physical, dry color composition of claim 3, wherein said polyethylene is LLDPE, LDPE, or HDPE.

9. The physical, dry color composition of claim 4, wherein said polyethylene is LLDPE, LDPE, or HDPE.

10. A process for making a physical, dry color polymer blend of claim 1, comprising the steps of:
    making a preblend comprising a mixture of one or pigments and one or more polyethylene copolymers; and
    subsequently mixing said preblend with about 100 parts by weight of a polyethylene.

11. The method of claim 10, wherein said polyethylene copolymer is derived from ethylene monomers and an α-olefin having from about 4 to about 10 carbon atoms.

12. The method of claim 11, wherein said α-olefin is 1-octene.

13. The method of claim 10, wherein said polyethylene is high density polyethylene, low density polyethylene, or linear low density polyethylene, or any combination thereof.

14. The method of claim 10, wherein said physical, dry color, polymer blend has improved impact strength as compared to a blend not containing any polyethylene copolymer therein, and wherein the amount of said pigment in said preblend is from about 0.06 to about 0.9 parts by weight per one part by weight of said polyethylene copolymer.

15. The method of claim 10, wherein said physical, dry color, polymer blend has improved impact strength as compared to a blend not containing any polyethylene copolymer therein, and wherein the amount of said pigment in said preblend is from about 0.2 to about 0.80 parts by weight per one part by weight of said polyethylene copolymer.

16. The method of claim 15, wherein said physical, dry color, polymer blend has improved impact strength as compared to a blend not containing any polyethylene copolymer therein, and wherein the amount of said pigment in said preblend is from about 0.4 to about 0.75 parts by weight per one part by weight of said polyethylene copolymer.

17. The method of claim 14, wherein the amount of said pigment-polyethylene copolymer preblend is from about 1.06 to about 1.90 parts by weight per 100 parts by weight of said polyethylene.

18. The method of claim 15, wherein the amount of said pigment-polyethylene copolymer preblend is from about 1.2 to about 1.80 parts by weight per 100 parts by weight of said polyethylene.

19. The method of claim 16, wherein the amount of said pigment-polyethylene copolymer preblend is from about 1.4 to about 1.75 parts by weight per 100 parts by weight of said polyethylene.

20. The method of claim 10, wherein said polyethylene is high density polyethylene, low density polyethylene, or linear low density polyethylene, or any combination thereof.

21. The method of claim 15, wherein said polyethylene is high density polyethylene, low density polyethylene, or linear low density polyethylene, or any combination thereof.

* * * * *